(12) United States Patent
Abe et al.

(10) Patent No.: US 11,711,637 B2
(45) Date of Patent: Jul. 25, 2023

(54) SOLID-STATE IMAGING DEVICE

(71) Applicant: Nuvoton Technology Corporation Japan, Kyoto (JP)

(72) Inventors: Yutaka Abe, Osaka (JP); Hiroshi Fujinaka, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 0 days.

(21) Appl. No.: 17/868,276

(22) Filed: Jul. 19, 2022

(65) Prior Publication Data
US 2022/0353453 A1     Nov. 3, 2022

Related U.S. Application Data

(63) Continuation of application No. PCT/JP2021/004851, filed on Feb. 9, 2021.
(Continued)

(51) Int. Cl.
*H04N 25/772* (2023.01)
*H04N 25/79* (2023.01)
(Continued)

(52) U.S. Cl.
CPC ......... *H04N 25/772* (2023.01); *H04N 25/778* (2023.01); *H04N 25/79* (2023.01); *H04N 25/53* (2023.01); *H04N 25/65* (2023.01)

(58) Field of Classification Search
None
See application file for complete search history.

(56) References Cited

U.S. PATENT DOCUMENTS

2009/0244346 A1* 10/2009 Funaki ................. H04N 25/772
                                                              348/308
2013/0314574 A1    11/2013 Ishii et al.
(Continued)

FOREIGN PATENT DOCUMENTS

JP       2000-253320 A      9/2000
JP       2001-054022 A      2/2001
(Continued)

OTHER PUBLICATIONS

International Search Report dated Apr. 13, 2021 in International Patent Application No. PCT/JP2021/004851, with English translation.

*Primary Examiner* — Mark T Monk
(74) *Attorney, Agent, or Firm* — McDermott Will & Emery LLP

(57) ABSTRACT

A solid-state imaging device includes: a plurality of pixel cells arranged in a matrix. In the solid-state imaging device, each of the plurality of pixel cells includes: a photoelectric converter that generates charge by photoelectric conversion, and holds a potential according to an amount of the charge generated; an initializer that initializes the potential of the photoelectric converter; a comparison section that compares the potential of the photoelectric converter and a predetermined reference signal, and causes the initializer to perform initialization when the potential of the photoelectric converter and the predetermined reference signal match; and a counter that counts a total number of times of initialization performed by the initializer, and outputs a signal corresponding to the total number of times as a first signal indicating an intensity of incident light.

14 Claims, 17 Drawing Sheets

Related U.S. Application Data

(60) Provisional application No. 62/976,709, filed on Feb. 14, 2020.

(51) Int. Cl.
*H04N 25/778* (2023.01)
*H04N 25/53* (2023.01)
*H04N 25/65* (2023.01)

(56) References Cited

U.S. PATENT DOCUMENTS

| | | |
|---|---|---|
| 2017/0237917 A1 | 8/2017 | Sato et al. |
| 2020/0128205 A1 | 4/2020 | Sakakibara et al. |

FOREIGN PATENT DOCUMENTS

| | | |
|---|---|---|
| JP | 2005-252743 A | 9/2005 |
| JP | 2018-050319 A | 3/2018 |
| JP | 2018-186478 A | 11/2018 |
| WO | 2012/105259 A1 | 8/2012 |
| WO | 2016/056394 A1 | 4/2016 |

\* cited by examiner

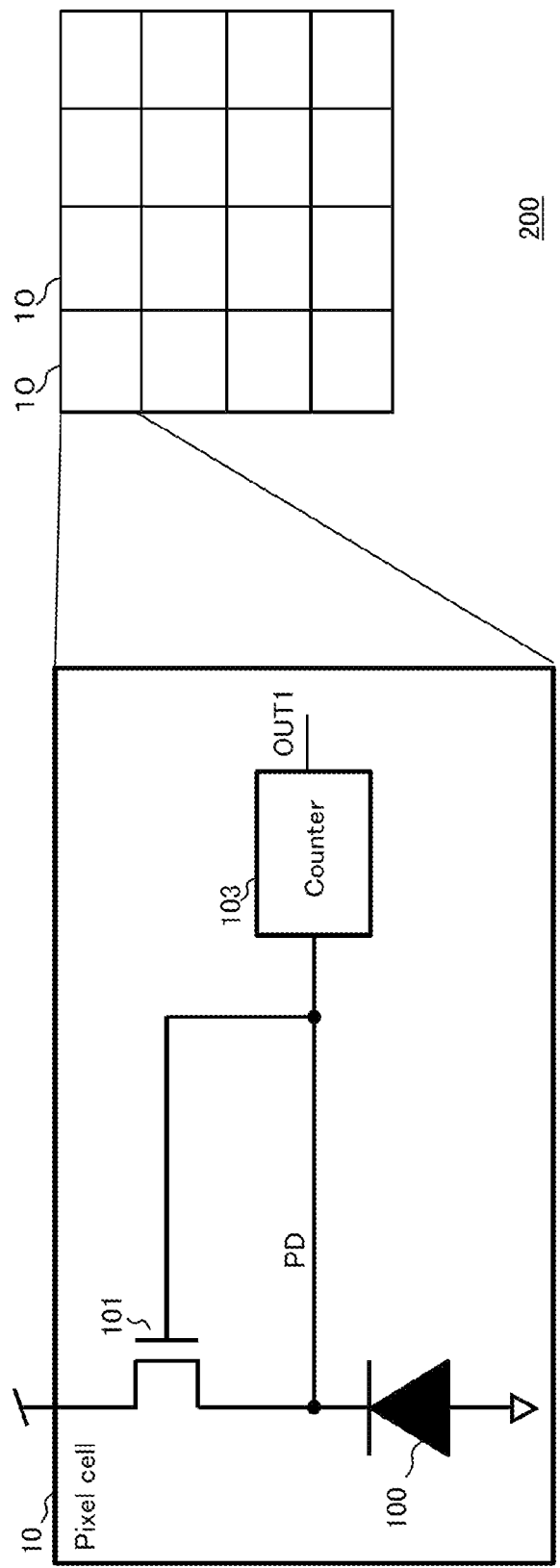

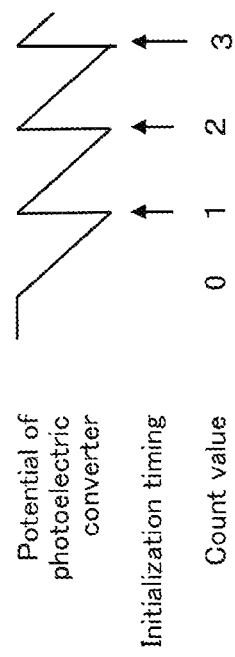

SOLID-STATE IMAGING DEVICE

CROSS REFERENCE TO RELATED APPLICATIONS

This is a continuation application of PCT International Application No. PCT/JP2021/004851 filed on Feb. 9, 2021, designating the United States of America, which is based on and claims priority of U.S. Provisional Patent Application No. 62/976,709 filed on Feb. 14, 2020. The entire disclosures of the above-identified applications, including the specifications, drawings, and claims are incorporated herein by reference in their entirety.

FIELD

The present disclosure relates to a solid-state imaging device.

BACKGROUND

Patent Literature (PTL) 1 discloses a pulse modulation method as a method for detecting a light intensity for a complementary metal-oxide semiconductor (CMOS) image sensor. As the pulse modulation method, a pulse width modulation (PWM) method, etc. are introduced. The PWM method is a method that causes the intensity of incident light to be reflected to a pulse width.

CITATION LIST

Patent Literature

PTL 10 Japanese Unexamined Patent Application Publication No. 2005-252743

SUMMARY

Technical Problem

However, further improvement in speed and accuracy is desired for the conventional solid-state imaging devices.

The present disclosure provides a solid-state imaging device capable of achieving higher speed and higher accuracy.

Solution to Problem

A solid-state imaging device according to one aspect of the present disclosure includes: a plurality of pixel cells arranged in a matrix. In the solid-state imaging device, each of the plurality of pixel cells includes: a photoelectric converter that generates charge by photoelectric conversion, and holds a potential according to an amount of the charge generated; an initializer that initializes the potential of the photoelectric converter; a comparison section that compares the potential of the photoelectric converter and a predetermined reference signal, and causes the initializer to perform initialization when the potential of the photoelectric converter and the predetermined reference signal match; and a counter that counts a total number of times of initialization performed by the initializer, and outputs a signal corresponding to the total number of times as a first signal indicating an intensity of incident light.

Advantageous Effects

The solid-state imaging device according to the present disclosure enables improvement in speed and accuracy.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1A illustrates a schematic configuration of a solid-state imaging device according to an embodiment.

FIG. 1B is a diagram illustrating an operation of the solid-state imaging device of FIG. 1A.

FIG. 118 is a diagram illustrating the voltage waveforms generated by a tapered voltage generator illustrated in FIG. 11A.

DESCRIPTION OF EMBODIMENTS

Figure 2A:
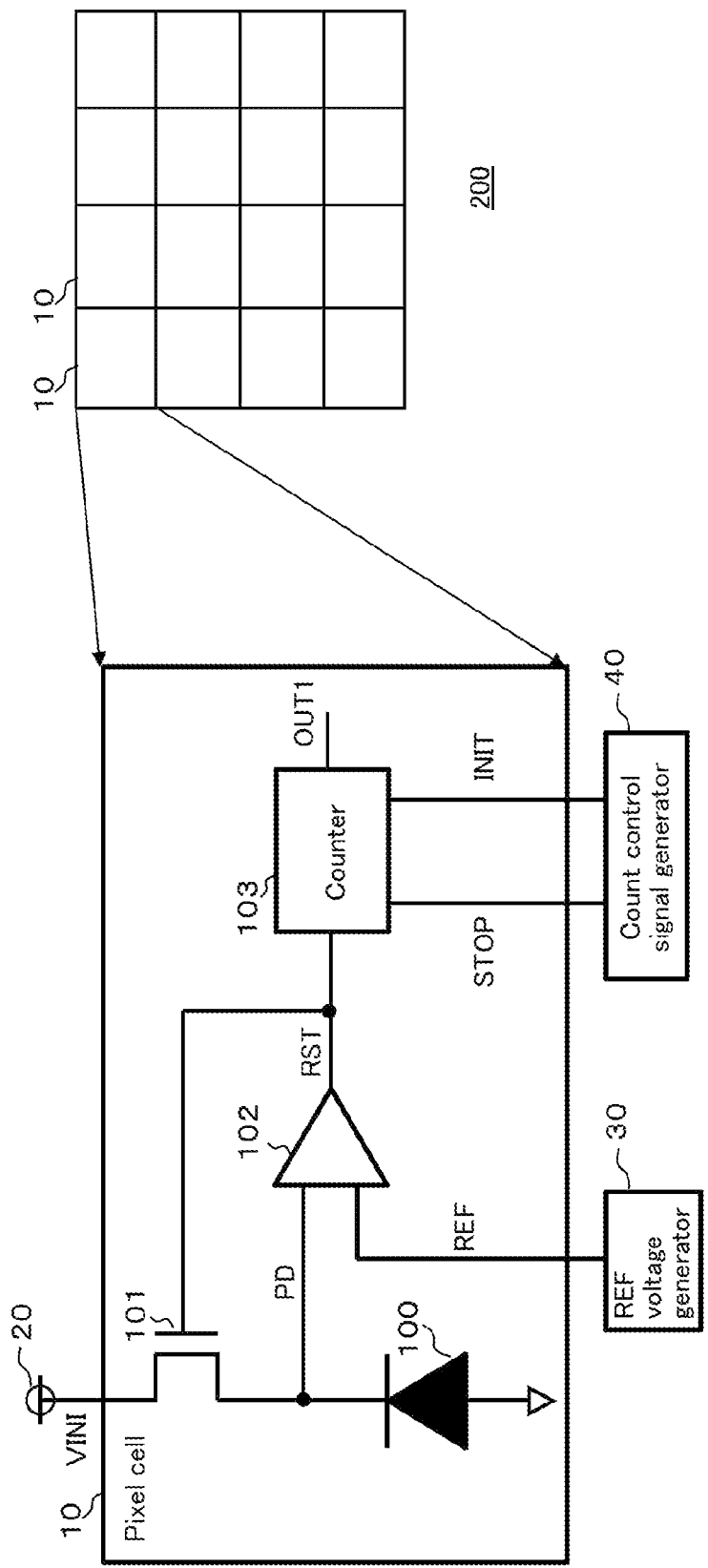
FIG. 2A is a diagram illustrating an example of the configuration of a solid-state imaging device according to Embodiment 1.

First, an outline of a solid-state imaging device according to one aspect of the present disclosure will be described.

A solid-state imaging device according to one aspect of the present disclosure includes: a plurality of pixel cells arranged in a matrix. In the solid-state imaging device, each of the plurality of pixel cells includes: a photoelectric converter that generates charge by photoelectric conversion, and holds a potential according to an amount of the charge generated; an initializer that initializes the potential of the photoelectric converter; a comparison section that compares the potential of the photoelectric converter and a predetermined reference signal, and causes the initializer to perform initialization when the potential of the photoelectric converter and the predetermined reference signal match; and a counter that counts a total number of times of initialization performed by the initializer, and outputs a signal corresponding to the total number of times as a first signal indicating an intensity of incident light.

According to the above-described configuration, it is possible to generate the first signal as a digital signal, and thus higher speed is easily achieved. In addition, even when incident light is so strong that the amount of charge generated by photoelectric conversion significantly exceeds the amount of saturation charge of photoelectric converter, image capturing is carried out with initialization, and thus it is possible to perform image capturing with high accuracy even in a very bright scene.

For example, the solid-state imaging device may further include an AD converter that converts the potential of the photoelectric converter from analog to digital after a last initialization, and outputs converted data as a second signal indicating an intensity of incident light.

According to the above-described configuration, the charge remaining in the photoelectric converter without being initialized after the last initialization is AD converted and output as the second signal. The second signal corresponds to an amount of charge that is less than one count of the first signal, and thus it is possible to obtain the intensity of incident light with higher accuracy.

For example, the AD converter may be disposed for each of the plurality of pixel cells.

According to the above-described configuration, it is possible to easily implement global shutter.

For example, the AD converter may be disposed for each predetermined number of the plurality of pixel cells.

According to the above-described configuration, when the predetermined number of pixel cells are pixel cells per column, it is possible to easily implement rolling shutter.

For example, the solid-state imaging device may further include a signal processor that generates a third signal indicating an intensity of incident light, by combining the first signal and the second signal.

According to the above-described configuration, it is possible to achieve both higher speed and higher accuracy. In regard to the higher speed, it is possible to easily increase the frame rate by reducing the number of bits of the counter and limiting the maximum count value, i.e., by limiting a total number of initializations that can be counted within one frame period. As described above, even when the total number of bits of the counter is limited, higher accuracy is achieved by the second signal, and thus it is possible to easily achieve both higher speed and higher accuracy.

For example, each of the plurality of pixel cells may further include a feedback circuit that feeds back the potential of the photoelectric converter to the photoelectric converter via the initializer when the initializer performs initialization.

According to the above-described configuration, it is possible to reduce the kTC noise during initialization, by initializing the potential of the photoelectric converter by feedback. As a result, it is possible to perform excellent image capturing with low noise even in a dark scene.

For example, the feedback circuit may include an amplification section which outputs, as an initial voltage, a difference between a voltage of the photoelectric converter and a predetermined voltage, to the initializer.

According to the above-described configuration, it is possible to configure a feedback path via the amplification section.

For example, the initializer may include a transistor, one of a source and a drain of the transistor may be connected to the photoelectric converter, the initial voltage may be input to a remaining one of the source and the drain of the transistor, a gate of the transistor may be connected to an output line indicating a result of the comparison by the comparison section, and the amplification section may include an amplifier which outputs, as the initial voltage, the difference between the voltage of the photoelectric converter and the predetermined voltage, to the remaining one of the source and the drain of the transistor.

According to the above-described configuration, since the initializer is configured by a transistor, it is possible to easily control the initialization operation to an appropriate speed. In addition, it is possible to configure the feedback loop with a simple circuit.

For example, the initializer may include a transistor, one of a source and a drain of the transistor may be connected to the photoelectric converter, an initial voltage may be input to a remaining one of the source and the drain of the transistor, and a gate of the transistor may be connected to an output line indicating a result of the comparison by the comparison section.

According to the above-described configuration, since the initializer is configured by a transistor, it is possible to easily control the initialization operation to an appropriate speed.

For example, each of the plurality of pixel cells further may include an initialization controller that causes the initializer to perform initialization when an output line indicating a result of the comparison by the comparison section is inverted, and feeds back the potential of the photoelectric converter to the photoelectric converter via the initializer.

According to the above-described configuration, it is possible to easily control at the same time the initializer and the feedback without causing a timing deviation between the control of the initializer and the control of the feedback.

For example, each of the plurality of pixel cells further may include: an overflow drain section for discharging charge; and a transfer transistor that transfers charge exceeding a predetermined amount of charge for the photoelectric converter to the overflow drain section, and a potential of the overflow drain section may be input to the comparison section as the potential of the photoelectric converter.

According to the above-described configuration, it is possible to reduce the total number of elements connected to the photoelectric converter, improve the amount of voltage per charge generated, and, for example, relatively suppress the effect of noise in the AD converter.

For example, the solid-state imaging device may further include a tapered voltage generator that generates a tapered voltage whose voltage varies over time and supplies the tapered voltage to the gate of the transistor when a signal indicating that the potential of the photoelectric converter matches a predetermined reference signal is input from the comparison section.

According to the above-described configuration, it is possible to suppress the kTC noise in the initialization operation. As a result, it is possible to perform excellent image capturing with low noise even in a dark scene.

For example, the solid-state imaging device may include: a first semiconductor substrate including the photoelectric converter; and a second semiconductor substrate including the counter, and the first semiconductor substrate and the second semiconductor substrate may be stacked.

According to the above-described configuration, it is possible to miniaturize solid-state imaging device by the stacked structure.

For example, the solid-state imaging device may include: a first semiconductor substrate including the photoelectric converter; and a second semiconductor substrate including the AD converter, and the first semiconductor substrate and the second semiconductor substrate may be stacked.

According to the above-described configuration, it is possible to miniaturize solid-state imaging device by the stacked structure.

The following describes in detail embodiments according to the present disclosure, with reference to the drawings. It should be noted that each of the exemplary embodiments described below shows one specific example of present disclosure. The numerical values, shapes, materials, structural components, the arrangement and connection of the structural components, timings for driving, etc. presented in the following embodiments are mere examples, and therefore do not limit the present disclosure. In addition, among the structural components in the following embodiments, components not recited in the independent claims which indicate the broadest concepts of the present disclosure are described as arbitrary structural components. In addition, the respective diagrams are not necessarily precise illustrations. Throughout the drawings, redundant description is omitted or simplified for substantially the same element.

Next, a schematic structure of the solid-state imaging device according to one aspect of the present disclosure will be described.

FIG. 1A illustrates a schematic configuration of solid-state imaging device 200 according to an embodiment, FIG. 1B is a diagram illustrating an operation performed by solid-state imaging device 200 illustrated in FIG. 1A.

As illustrated in FIG. 1A, solid-state imaging device 200 includes a plurality of pixel cells 10 arranged in a matrix. Each of the plurality of pixel cells 10 includes photoelectric converter 100, initializer 101 that initializes photoelectric converter 100, and counter 103.

Photoelectric converter 100 generates charge by photoelectric conversion, and holds a potential according to the amount of the charge generated. For example, as illustrated in FIG. 13, the potential of photoelectric converter 100 decreases over time from the initial voltage, due to the charge generation according to the amount of incident light.

When the voltage of photoelectric converter 100 decreases to a reference voltage, initializer 101 initializes the potential of photoelectric converter 100 to an initial voltage. For example, initializer 101 is placed into an ON state at the timing indicated by an arrow in FIG. 13 at which the potential of photoelectric converter 100 decreases to the reference voltage, and initializes photoelectric converter 100. For example, the initial voltage may be power supply voltage Vdd, or may be a predetermined voltage value. Initializer 101 is placed into an OFF state as a result of the potential of photoelectric converter 100 being initialized to the initial voltage, and initialization is canceled.

Counter 103 counts a total number of times initializer 101 initializes photoelectric converter 100, and outputs a signal corresponding to the total number of times as a first signal indicating the intensity of incident light. In the example illustrated in FIG. 13, counter 103 starts a counting operation from the initial value 0 and counts up to 3. Digital signal OUT1 is an example of the first signal, and is a digital value indicating the value of 3 in FIG. 13.

As described above, solid-state imaging device 200 generates digital signal OUT1 for each of the pixel cells. In this manner, high-speed image capturing is enabled. Furthermore, even in a state in which light that is so strong that photoelectric conversion is impossible in photoelectric converter 100 (i.e., the amount of charge resulting from photoelectric conversion exceeds a saturation charge amount) is emitted to photoelectric converter 100, photoelectric converter 100 generates digital signals while being subjected to initialization. As a result, it is possible to capture an image even in a scene that is bright enough to exceed the conversion capacity of photoelectric converter 100.

Embodiment 1

Figure 3:
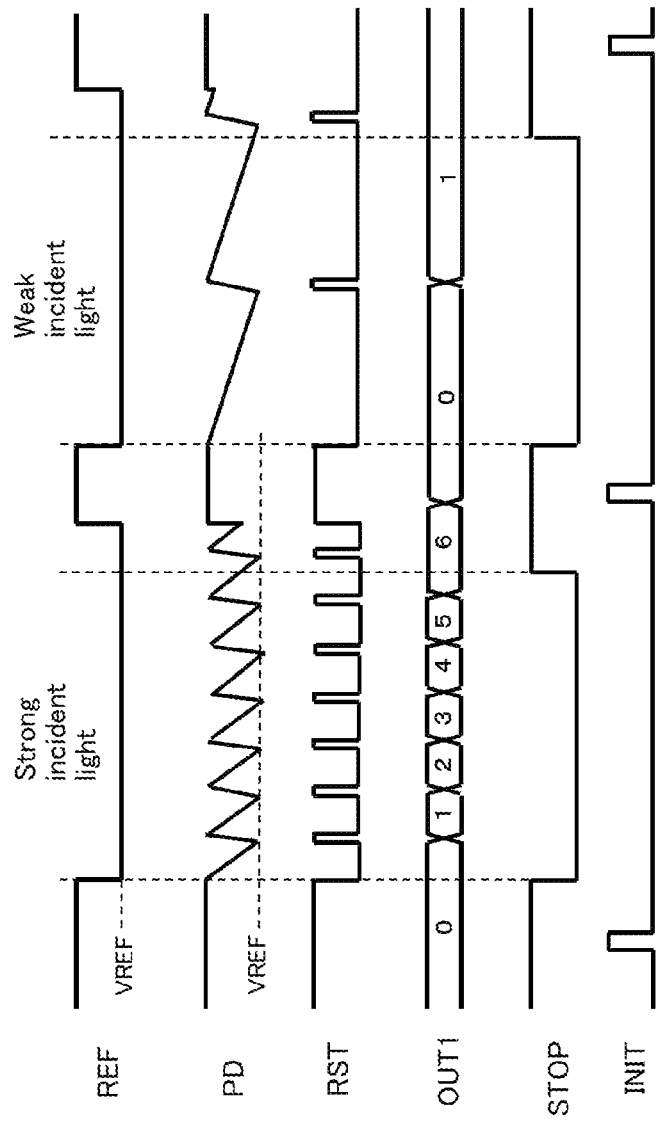
FIG. 3 is a time chart illustrating an example of the operation performed by the solid-state imaging device according to Embodiment 1.

In Embodiment 1, an example of the configuration of solid-state imaging device 200 will be described in more detail. FIG. 2A is a diagram illustrating an example of the configuration of solid-state imaging device 200 according to Embodiment 2. FIG. 3 is a time chart illustrating an example of the operation performed by solid-state imaging device 200 illustrated in FIG. 2A.

As illustrated in FIG. 2A and FIG. 3, solid-state imaging device 200 according to the present embodiment differs from solid-state imaging device 200 illustrated in FIG. 1A in that pixel cell 10 further includes comparison section 102, and solid-state imaging device 200 further includes reset voltage generator 20 connected to pixel cell 10, REF voltage generator 30, and count control signal generator 40. It should be noted that REF refers to the reference signal for comparison. In the following description, redundant explanation will be omitted to focus on the differences.

Comparison section 102 compares the potential of photoelectric converter 100 with predetermined reference signal REF, and causes initializer 101 to perform initialization when the potential of photoelectric converter 100 and predetermined reference signal REF match. More specifically, comparison section 102 compares the high/low relationship between the voltage of output signal PD of photoelectric converter 100 and the voltage of reference signal REF output by REF voltage generator 30, and outputs reset signal RST of a low level when the voltage of output signal PD is higher than the voltage of reference signal REF and outputs reset signal RST of a high level when the voltage of output signal PD is not higher than the voltage of reference signal REF.

Reset voltage generator 20 generates output signal VINI. Output signal VINI may be, for example, power supply voltage VDD, or any other voltage value. Output signal VINI is supplied to photoelectric converter 100 via initializer 101 as an initial voltage or a reset voltage.

REF voltage generator 30 generates reference signal REF. Reference signal REF may be, for example, the voltage value of photoelectric converter 100 when the charge held in photoelectric converter 100 is saturated, or may be a voltage value between the voltage value and power supply voltage VDD.

Count control signal generator 40 generates count initialization signal INIT and count stop signal STOP so as to control counter 103. Count initialization signal INIT is a control signal to initialize the count value of counter 103 to 0. Count stop signal STOP is a control signal to cause counter 103 to perform or stop the counting operation.

The time chart illustrated in FIG. 3 indicates the image capturing operation for two frames. The first frame corresponds to relatively strong incident light, and the second frame corresponds to relatively weak incident light.

As illustrated in FIG. 3, when reset signal RST is at a high level, initializer 101 initializes output signal PD of photoelectric converter 100 to output signal VINI output by reset voltage generator 20.

When count stop signal STOP output by count control signal generator 40 is at a low level, counter 103 counts a total number of times reset signal RST transitions from the low level to the high level, and outputs a result of the counting into count signal OUT1. Counter 103 stops counting when count stop signal STOP is at a high level, and initializes the count value to 0 when count initialization signal INIT is at a high level.

In addition, as a result of setting reference signal REF to power supply voltage VDD which is higher than output signal VINI, reset signal RST is at a high level, to initialize photoelectric converter 100, and as a result of setting count initialization signal INIT and count stop signal STOP to a high level, count signal OUT1 is initialized to 0.

In addition, as a result of (i) setting count initialization signal INIT and count stop signal STOP to a low level and (ii) setting reference signal REF to a voltage lower than output signal VINI, reset signal RST is at a low level, to stop initialization. The voltage of output signal PD decreases from output signal VINI at a rate according to the amount of light emission. When the voltage of output signal PD reaches voltage REF, reset signal RST transitions to a high level, count signal OUT1 becomes 1 and photoelectric converter 100 is initialized, the voltage of output signal PD becomes output signal VINI, and reset signal RST is placed at a low level.

In addition, the voltage of output signal PD decreases from output signal VINI at a rate according to the amount of light emission. When the voltage of output signal PD reaches voltage REF, reset signal RST transitions to a high level, count signal OUT1 becomes 2 and photoelectric converter 100 is initialized, and the voltage of output signal PD becomes output signal VINI.

In addition, count stop signal STOP is place at a high level, and the count signal continues to hold the count value at that point, thereby generating digital signal OUT1 according to the amount of light emitted to photoelectric convertor 100 for each of the pixel cells.

Solid-state imaging device 200 according to the present embodiment as described above with reference to FIG. 2A and FIG. 3 resets when a certain amount of charge is accumulated, and outputs a total number of times of resets as a digital value. Solid-state imaging device 200 generates a digital signal for each of the pixel cells, thereby enabling high-speed image capturing. Moreover, even in a state in which light that is so strong that photoelectric conversion is impossible in photoelectric converter 100 is emitted to photoelectric converter 100, photoelectric converter 100 generates a digital signal while being subjected to initialization. As a result, it is possible to capture an image even in a scene that is bright enough to exceed the conversion capacity of photoelectric converter 100. In addition, photoelectric convertor 100 is capable of capturing an image involving initialization even when the light-receiving area is reduced. It is thus possible to reduce the size and cost of solid-state imaging device 200.

It should be noted that, when the total number of bits of counter 103 is M bits, it is possible to count the total number of times of initialization up to ($2^M$-1) times. For example, M may be determined according to the difference between VINI and REF.

Figure 2B:
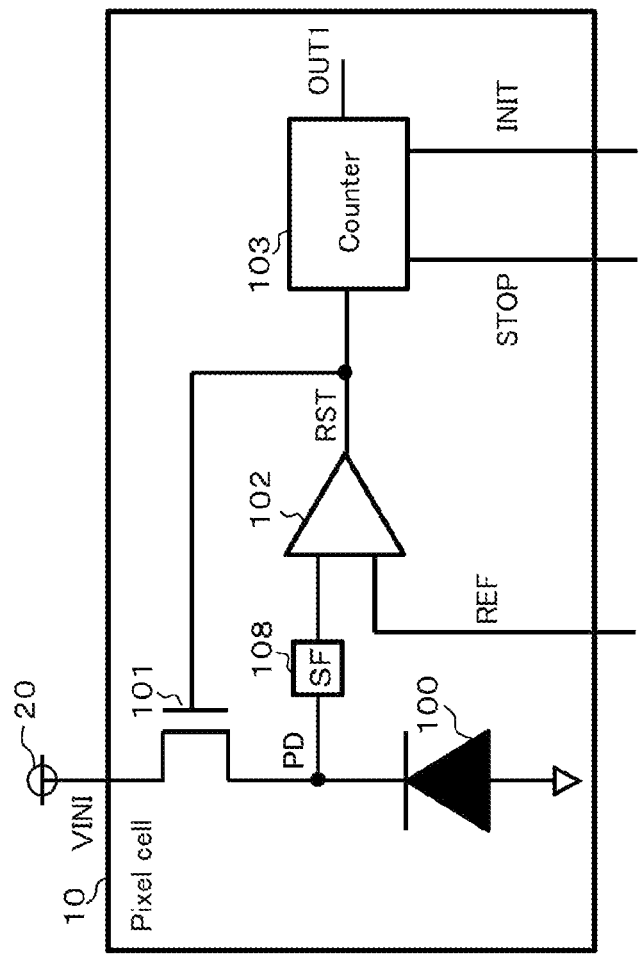
FIG. 2B is a diagram illustrating an example of another configuration of a pixel cell illustrate in FIG. 2A.
Figure 2C:
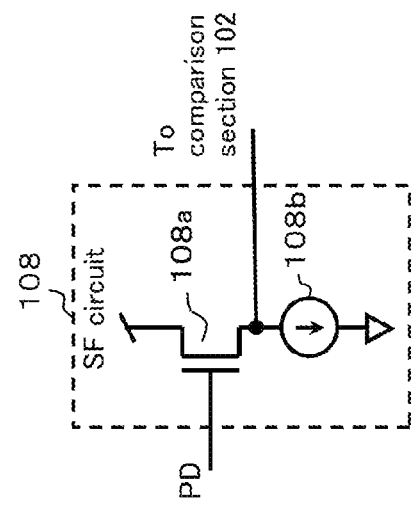
FIG. 2C is a circuit diagram illustrating an example of an SF circuit illustrated in FIG. 2B.

It should be noted that pixel cell 10 may include source follower (SF) circuit 108 as illustrated in FIG. 2B. FIG. 2C illustrates an example of the configuration of SF circuit 108. As illustrated in FIG. 2C, SF circuit 108 includes amplification transistor 108a and current supply 108b. Amplification transistor 108a converts the potential generated by the charge of photoelectric converter 100 to a voltage, and outputs the voltage to comparison section 102. Current supply 108b is a load that supplies load current to amplification transistor 108a, and can be configured of, for example, a resistive element, a diode, a transistor, etc. The configuration as illustrated in FIG. 2B allows to stabilize the operation by inhibiting the destruction of the charge of photoelectric converter 100.

Embodiment 2

Figure 4:
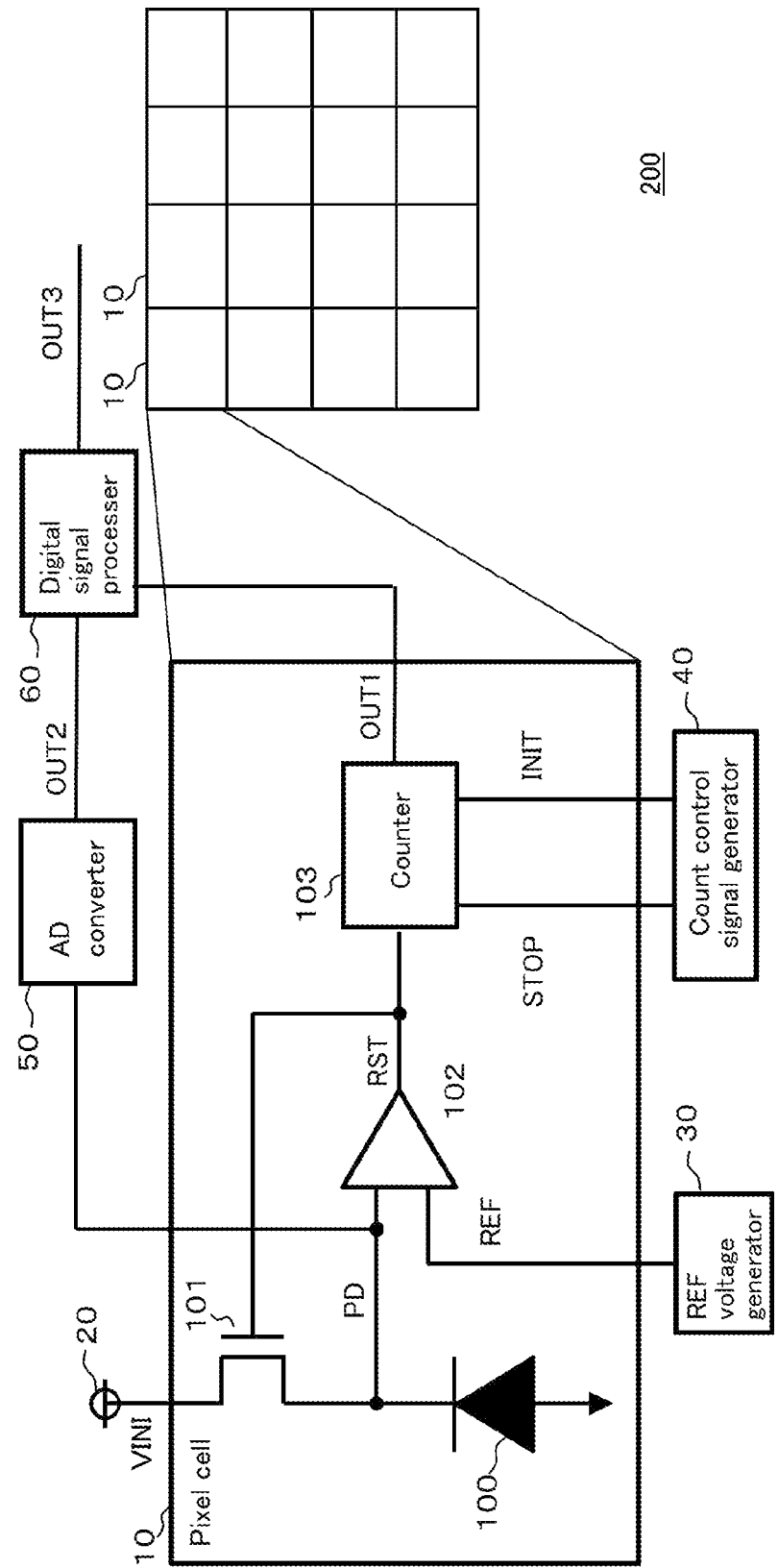
FIG. 4 is a diagram illustrating an example of the configuration of a solid-state imaging device according to Embodiment 2.
Figure 5:
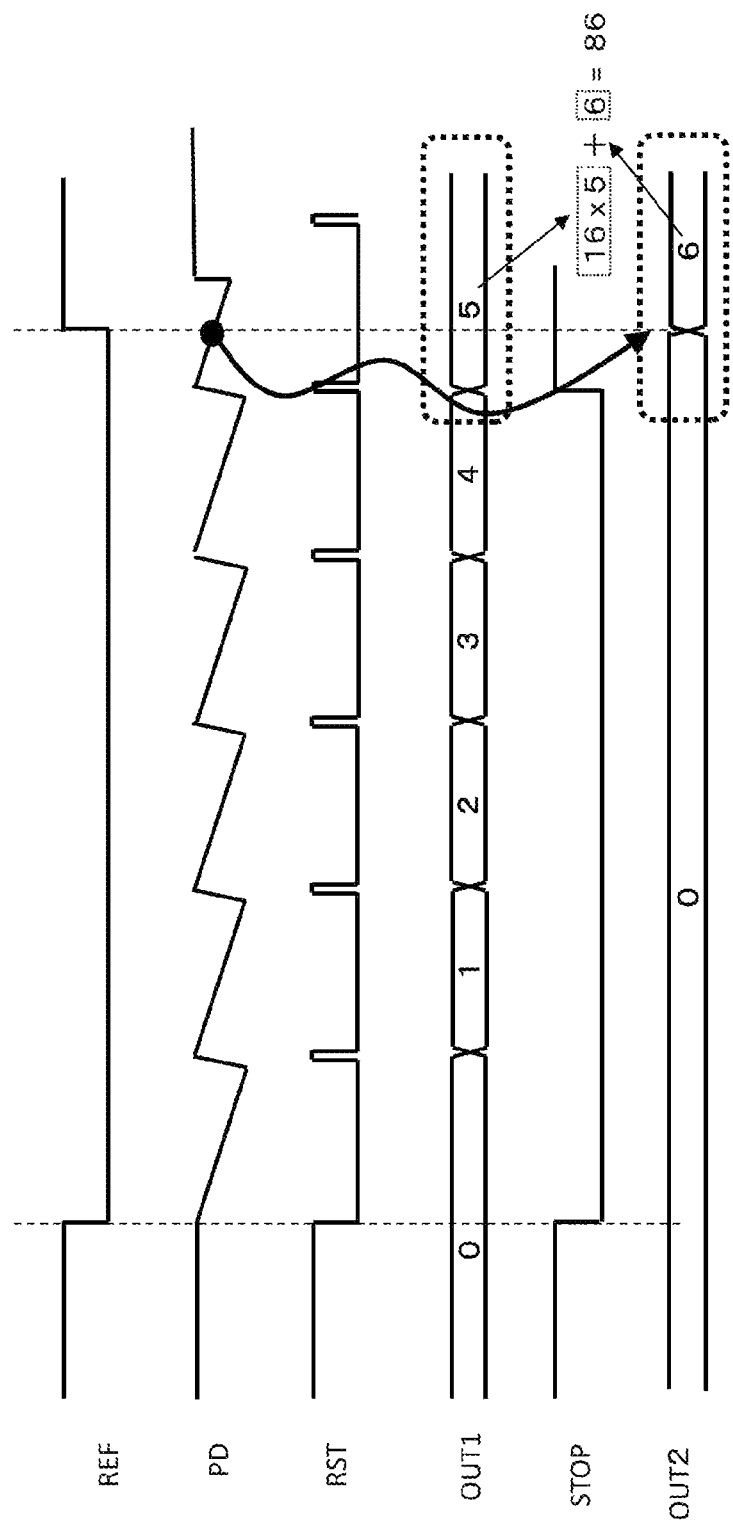
FIG. 5 is a time chart illustrating an example of the operation performed by the solid-state imaging device according to Embodiment 2.

In Embodiment 2, a solid-state imaging device that can achieve a higher accuracy by including AD converter 50 than the solid-state imaging device according to Embodiment 1 will be described, FIG. 4 is a diagram illustrating an example of the configuration of solid-state imaging device 200 according to Embodiment 2. FIG. 5 is a time chart illustrating an example of the operation performed by solid-state imaging device 200 illustrated in FIG. 4.

According to FIG. 4 and FIG. 5, solid-state imaging device 200 according to the present embodiment differs from solid-state imaging device 200 illustrated in FIG. 2A in that solid-state imaging device 200 according to the present embodiment includes AD converter 50 connected to pixel cell and digital signal processor 60. In the following description, redundant explanation will be omitted, to focus on the differences.

AD converter 50 AD converts the potential of photoelectric converter 100 from analog to digital after the last initialization in a frame, and outputs the AD converted data as a second signal indicating the intensity of the incident light. More specifically, AD converter 50 outputs digital signal OUT2 corresponding to the voltage of output signal PD after counter 103 stops counting. AD converter 50 may be, for example, a single slope AD converter. Alternatively, AD converter 50 may correspond to another method, such as a sequential comparison method or the like.

Digital signal processor 60 generates digital signal OUT3 that is a third signal indicating the intensity of incident light, by combining count signal OUT1 that is the first signal and digital signal OUT2 that is the second signal. For example, digital signal processor 60 combines count signal OUT1 and digital signal OUT2 to generate new digital signal OUT5. In the example illustrated in FIG. 5, count signal OUT1 is 5, and digital signal OUT2 is 6. It is assumed that AD converter 50 is 4 bits with a resolution of 16. It is also assumed that counter 103 is 12 bits with a resolution of $2^{12}$. In this case, digital signal OUT3 is 16 bits with a resolution of $2^{16}$. Digital signal OUT3 is (16×count signal OUT1+digital signal OUT2)=(16×5+6)=96.

When a total number of bits of counter 103 is M and a total number of bits of AD converter 50 is L, a total number of bits of digital signal OUT3 is M+L bits.

It should be noted that digital signal processor 60 may simply concatenate the M-bit data of count signal OUT1 and the L-bit data of digital signal OUT2 as MSB side data and LSB side data.

In addition, digital signal processor 60 may perform calculation to combine the Mbit data of count signal OUT1 and the L-bit data of digital signal OUT2 as MSB side data and LSB side data, into the data of digital signal OUT3 with a smaller number of bits than (M+L).

On the other hand, digital signal processor 60 may perform calculation to combine the M-bit data of count signal OUT1 and the L-bit data of digital signal OUT2 as MSB side data and LSB side data, into the data of digital signal OUT3 with a larger number of bits than (M+L).

The solid-state imaging device according to the present embodiment as described above with reference to FIG. 4 and FIG. 5 performs AD conversion on residuals and digitally outputs a result of the AD conversion together with the total number of times of resets. This makes it possible to output a higher-definition digital signal according to the amount of light emission. As a result, it is possible to achieve excellent image capturing that reproduces luminance and color tones more closely resembling those of the outside world.

It should be noted that AD converter 50 may be included for each of pixel cells 10. In this manner, it is possible to easily implement global shutter.

Alternatively, AD converter 50 may be included for each predetermined number of pixel cells 10. The predetermined number of pixel cells 10 may be every 10 pixel cells that belong to the same column. When the predetermined number of pixel cells are pixel cells per column, it is possible to easily implement so-called rolling shutter.

It should be noted that, in FIG. 5, digital signal processor 60 may perform correlated double sampling (CDS) in the AD conversion of the residuals. In addition, digital signal processor 60 may perform CDS using AD converter 50 in each section from the initialization to the next initialization of output signal PD other than the residuals. In addition, whether or not to perform CDS in each section may be selectively determined in advance or dynamically. For example, CDS may be performed on output signal PD up to the first initialization, or CDS may be performed only in low illuminance.

Embodiment 3

In Embodiment 3, a configuration which includes a feedback circuit that feeds back the potential of photoelectric converter 100 to photoelectric converter 100 via initializer 101 at the time of initialization performed by initializer 101. It is possible chancel kTC noise at the time of initialization, by the feedback of an initial voltage.

Figure 6A:
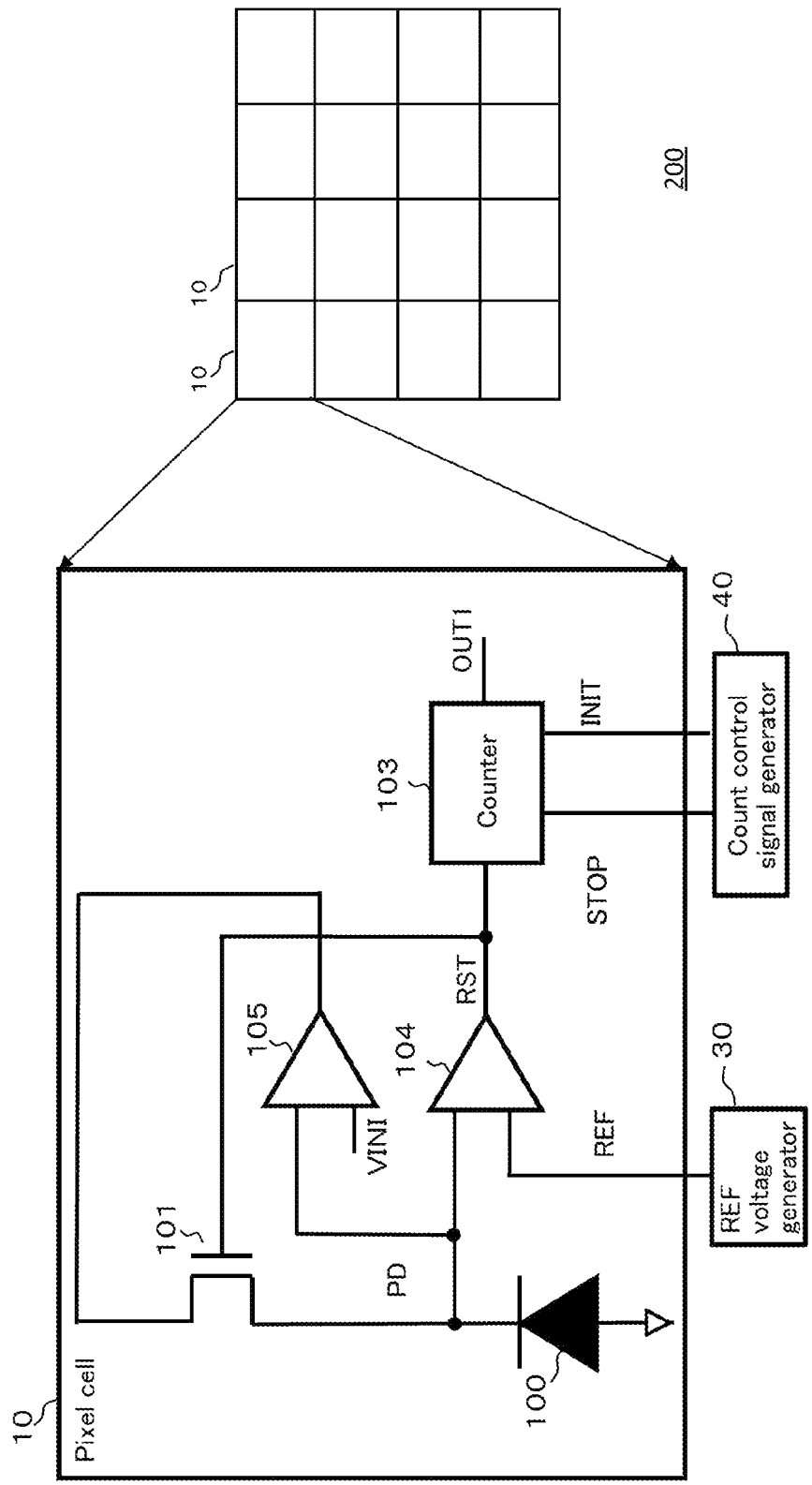
FIG. 6A is a diagram illustrating an example of the configuration of a solid-state imaging device according to Embodiment 3.
Figure 7:
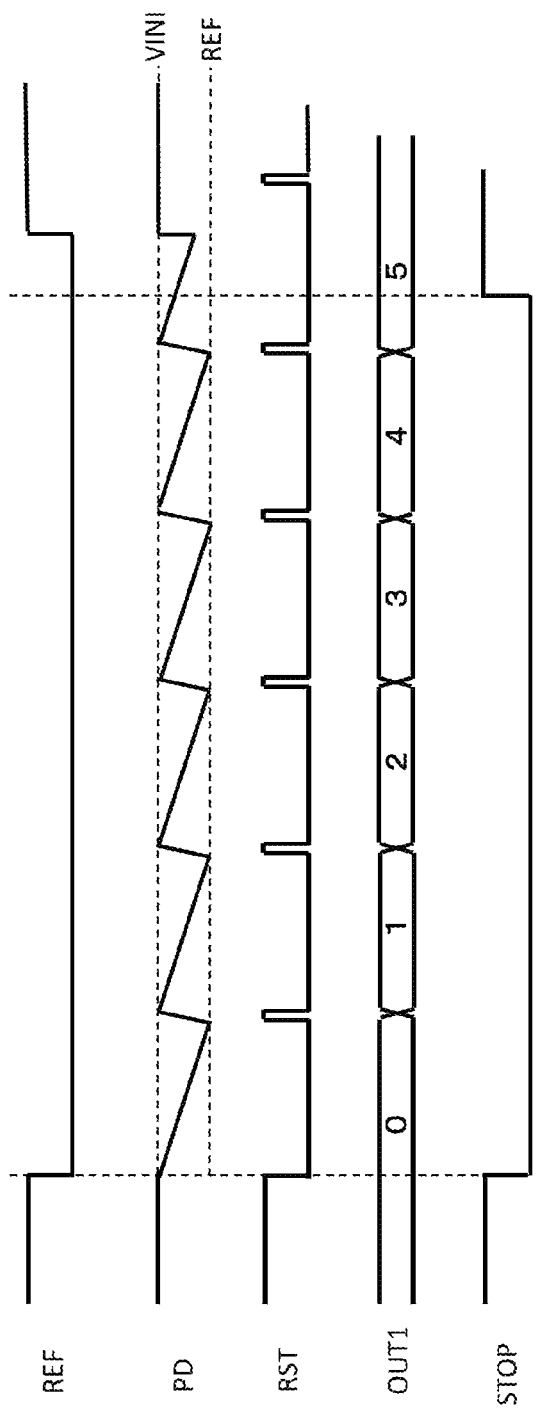
FIG. 7 is a time chart illustrating an example of the operation performed by the solid-state imaging device according to Embodiment 3.

FIG. 6A is a diagram illustrating an example of the configuration of solid-state imaging device 200 according to the present embodiment. FIG. 7 is a time chart illustrating an example of the operation performed by solid-state imaging device 200 illustrated in FIG. 6A.

According to FIG. 6A and FIG. 7, solid-state imaging device 200 according to the present embodiment differs from solid-state imaging device 200 illustrated in FIG. 2A in that pixel cell 10 includes inverted amplification section 104 and inverted amplification section 105 instead of comparison section 102 and that pixel cell 10 includes a feedback circuit including inverted amplification section 105 to which output signal VINI of reset voltage generator 20 is input.

Inverted amplification section 104 is an operational amplifier and, as with comparison section 102, (i) compares the high/low relationship between the voltage of output signal PD of photoelectric converter 100 and the voltage of reference signal REF output by REF voltage generator 30, and (ii) outputs reset signal RST of a low level when the voltage of output signal PD is higher, and outputs reset signal RST of a high level when the voltage of output signal PD is lower.

In addition, inverted amplification section 105 is an operational amplifier and constitutes a feedback circuit that feeds back the potential of photoelectric converter 100 to photoelectric converter 100 via initializer 101 at the time of initialization performed by initializer 101. More specifically, inverted amplification section 105 amplifies and outputs the difference between the voltage of output signal PD and output signal VINI of the signal output by reset voltage generator 20.

The solid-state imaging device according to the present embodiment described above with reference to FIG. 6A and FIG. 7 performs a feedback reset. These configurations and operations enable high-speed image capturing by generating a digital signal for each of the pixel cells. Moreover, even in a state in which light that is so strong that photoelectric conversion is impossible in photoelectric converter 100 is emitted to photoelectric converter 100, photoelectric converter 100 generates a digital signal while being subjected to initialization. As a result, it is possible to capture an image even in a scene that is bright enough to exceed the conversion capacity of photoelectric converter 100. In addition, it is possible to reduce the noise at the time of initialization, by adding inverted amplification section 105 and performing initialization by feeding back an amplified signal. As illustrated in FIG. 7, it is possible to set each of output signals PD immediately after the initialization to a level with little variation due to noise. As a result, it is possible to perform excellent image capturing with low noise even in a dark scene.

Figure 6B:
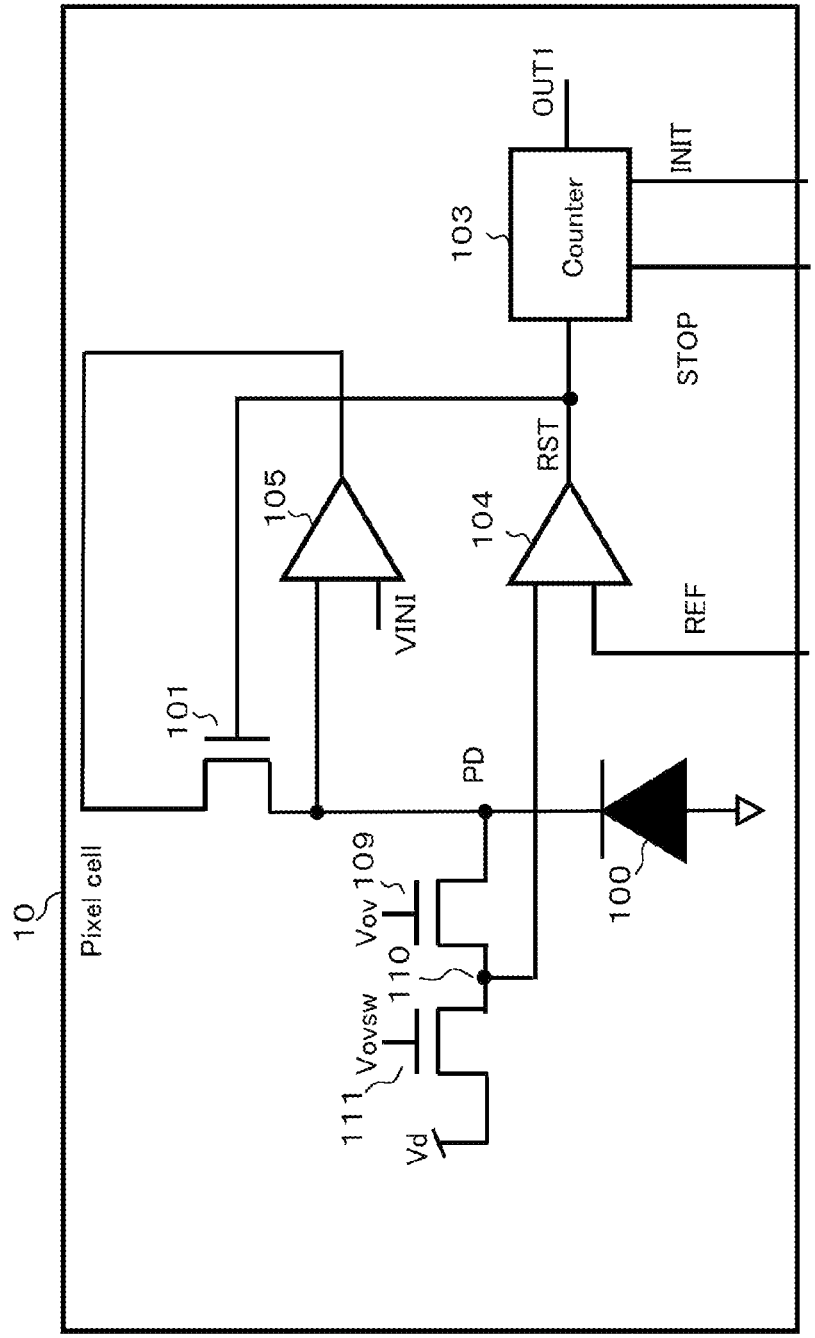
FIG. 6B is a diagram illustrating an example of another configuration of the solid-state imaging device according to Embodiment 3.

It should be noted that, as illustrated in FIG. 6B, pixel cell 10 illustrated in FIG. 6A may include transfer transistor 109, overflow drain section 110, and overflow drain control transistor 111.

Transfer transistor 109 is a transfer transistor that transfers charge exceeding a predetermined amount of charge for photoelectric converter 100 to overflow drain section 110. The gate of transfer transistor 109 is set to voltage Vov that allows the charge exceeding the predetermined amount to pass through.

Overflow drain section 110 is a port for discharging charge that is set to voltage Vd when overflow drain control transistor 111 is in an ON state. Voltage Vd may be, for example, power supply voltage Vdd, or may be any other voltage value.

According to FIG. 6B, by placing overflow drain control transistor 111 into an OFF state in the photoelectric conversion period, the voltage of overflow drain section 110 changes in response to the charge that overflows from photoelectric converter 100. When the potential of overflow drain section 110 decreases to the voltage of reference signal REF, inverted amplification section 104 and initializer 101 reset photoelectric converter 100. In this manner, it is possible to reduce the total number of elements connected to photoelectric converter 100, improve the amount of voltages per charge generated, and, for example, relatively suppress the effect of noise in AD converter 50.

Embodiment 4

In Embodiment 4, an example of the configuration in which Embodiment 2 and Embodiment 3 are combined will be described.

Figure 8:
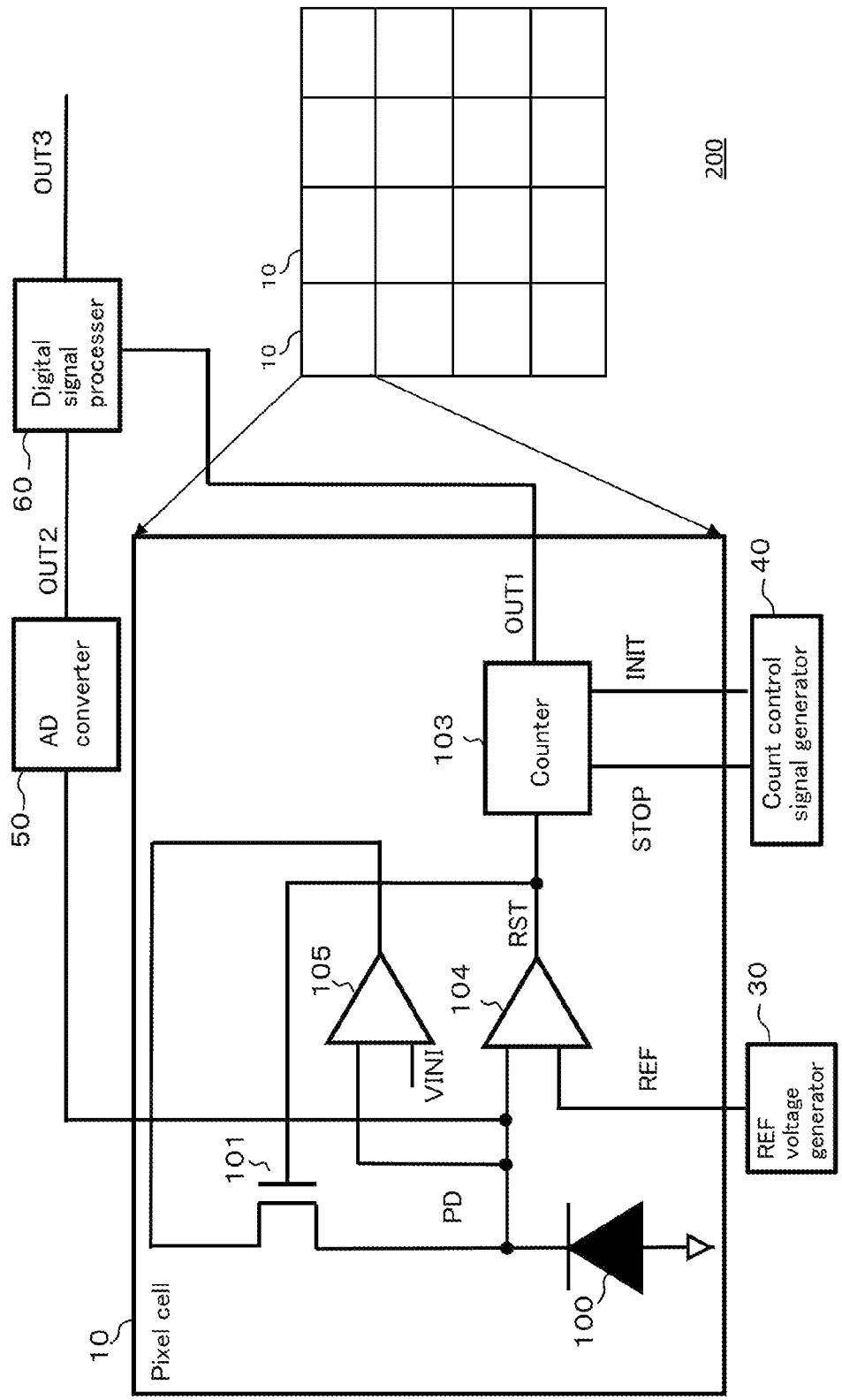
FIG. 8 is a diagram illustrating an example of the configuration of a solid-state imaging device according to Embodiment 4.

FIG. 8 is a diagram illustrating an example of the configuration of solid-state imaging device 200 according to Embodiment 4. Solid-state imaging device 200 illustrated in FIG. 8 includes pixel cell 10 illustrated in FIG. 6A of Embodiment 3 instead of pixel cell 10 illustrated in FIG. 4 of Embodiment 2.

Solid-state imaging device 200 illustrated in FIG. 8 includes AD converter 50 connected to pixel cell 10 and digital signal processor 60. AD converter 50 outputs digital signal OUT2 according to the voltage of output signal PD after counter 103 stops counting, and digital signal processor 60 combines count signal OUT1 and digital signal OUT2 to generate new digital signal OUTS.

Solid-state imaging device 200 illustrated in FIG. 8 performs AD conversion on residuals and digitally outputs a result of the AD conversion together with the total number of times of resets, in addition to the feedback reset. This makes it possible to output a higher-definition digital signal according to the amount of light emission. As a result, it is possible to achieve image capturing that reproduces luminance and color tones more closely resembling those of the outside world.

Embodiment 5

In Embodiment 5, an example of the configuration in which, when the output line indicating a result of the comparison performed by the comparison section is inverted, initializer 101 is caused to perform initialization and the potential of photoelectric converter 100 is fed back to photoelectric converter 100 via initializer 101 will be described.

Figure 9:
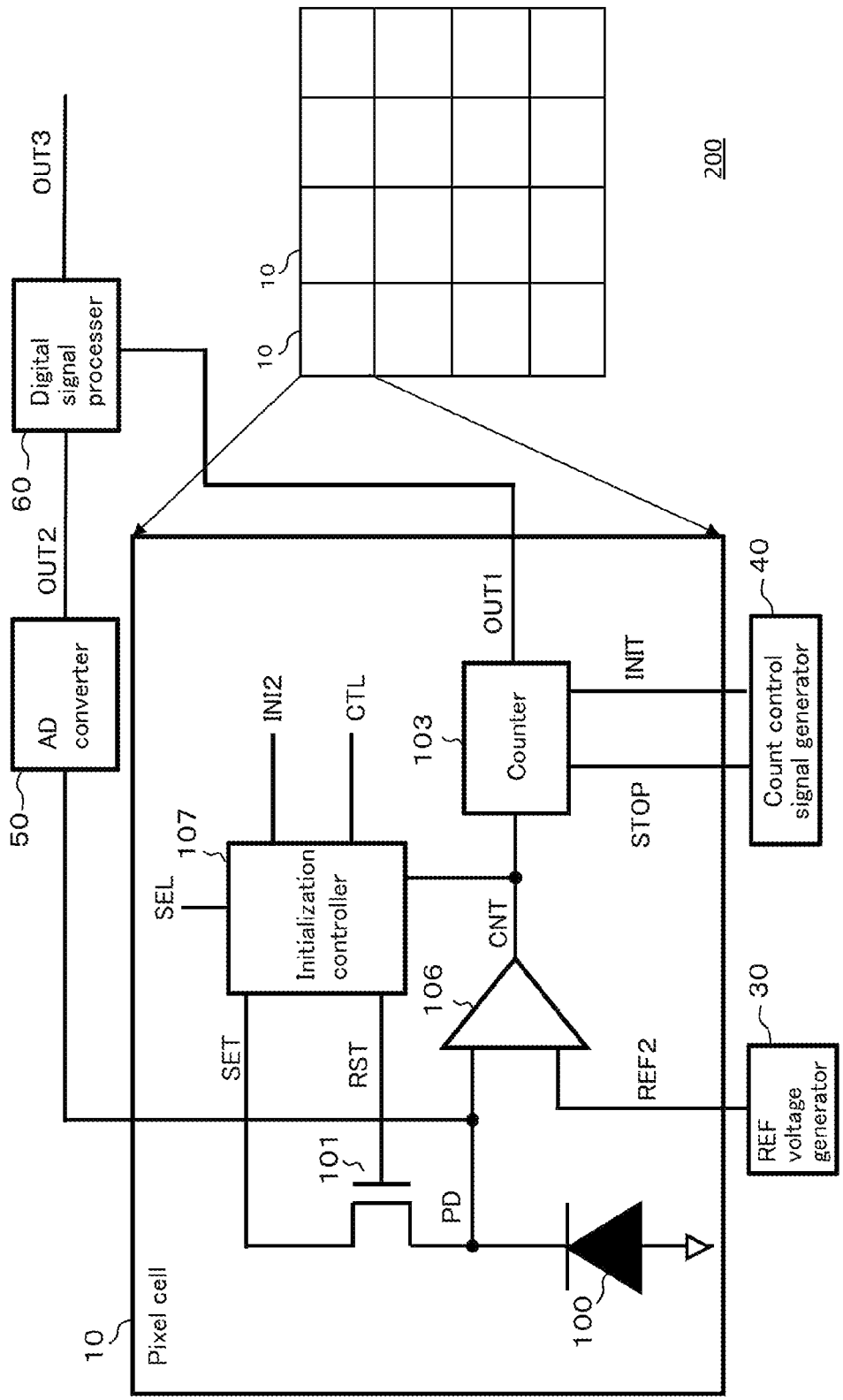
FIG. 9 is a diagram illustrating an example of the configuration of a solid-state imaging device according to Embodiment 5.
Figure 10:
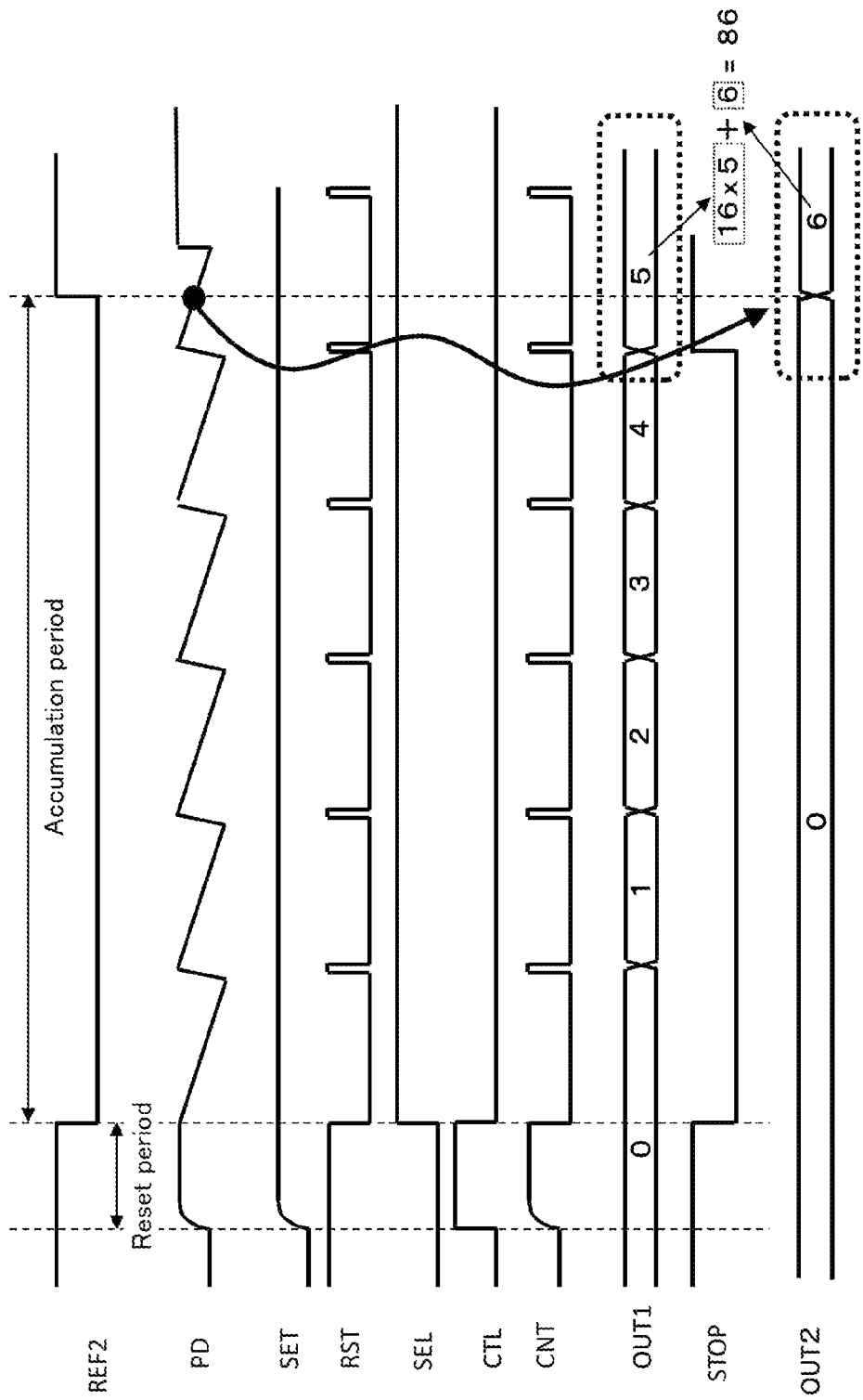
FIG. 10 is a time chart illustrating an example of the operation performed by the solid-state imaging device according to Embodiment 5.

FIG. 9 is a diagram illustrating an example of the configuration of solid-state imaging device 200 according to Embodiment 5. FIG. 10 is a time chart illustrating an example of the operation performed by solid-state imaging device 200 illustrated in FIG. 9.

According to FIG. 9 and FIG. 10, solid-state imaging device 200 according to the present embodiment differs from solid-state imaging device 200 illustrated in FIG. 1A in that pixel cell 10 further includes amplification section 106 and initialization controller 107. Solid-state imaging device 200 according to the present embodiment further includes REF voltage generator 30, count control signal generator 40, AD converter 50, and digital signal processor 60.

In addition, amplification section 106 amplifies and outputs the difference between the voltage of output signal PD of photoelectric converter 100 and the voltage of reference signal REF2 output by REF voltage generator 30.

When initialization selection signal SEL output from the above-described initialization controller 107 is at a low level, initialization controller 107 connects output signal CNT of amplification section 106 to input signal SET to initializer 101, and connects initialization signal CTL output from the above-described initialization controller 107 to reset signal RST to initializer 101. When initialization selection signal SEL is at a high level, initialization controller 107 connects output signal CNT to reset signal RST, and connects initialization voltage signal INI2 output from the above-described initialization controller 107 to input signal SET.

In addition, when reset signal RST is at a high level, initializer 101 initializes the voltage of output signal PD by connecting output signal PD of photoelectric converter 100 to input signal SET. When reset signal RST is at a low level, initializer 101 disconnects input signal SET from output signal PD, thereby putting output signal PD in a floating state.

When count stop signal STOP output by count control signal generator 40 is at a low level, counter 103 counts a total number of times reset signal RST transitions from the low level to the high level, and outputs a result of the counting into count signal OUT1. Counter 103 stops counting when count stop signal STOP is at a high level, and initializes the count value to 0 when count initialization signal INIT is at a high level.

In addition, photoelectric converter 100 is initialized to output signal VINI by setting reference signal REF2 to output signal VINI, initialization selection signal SEL to a low level, and initialization signal CTL to a high level, and count signal OUT1 is initialized to 0 by setting count initialization signal INT and count stop signal STOP to a high level.

In addition, by setting count initialization signal INI and count stop signal STOP to a low level, reference signal REF to a voltage VERF that is lower than output signal VINI, and initialization selection signal SEL to a high level, the feedback path between the input and output of amplification section 106 is cut off, amplification section 106 functions substantially as a comparison section, output signal CNT is placed at a low level, initialization is stopped, the voltage of output signal PD decreases from output signal VINI at a rate according to the amount of light emission, and when the voltage of output signal PD reaches voltage VERF, reset signal RST transitions to a high level, count signal OUT1 becomes 1, photoelectric converter 100 is initialized, the voltage of output signal PD becomes output signal VINI 2 of count initialization signal INI2, and reset signal RST is placed at a low level.

In addition, the voltage of output signal PD decreases from output signal VINI at a rate according to the amount of light emission. When the voltage of output signal PD reaches voltage VERF, output signal CNT transitions to a high level, count signal OUT1 becomes 2 and photoelectric converter 100 is initialized, and the voltage of output signal PD becomes output signal VINI2.

In addition, as a result of count stop signal STOP being placed at a high level and the count signal continuing to hold the count value at that point, a digital signal according to the amount of light emitted to photoelectric convertor 100 for each of the pixel cells is generated.

As described above, the solid-state imaging device according to the present embodiment described with reference to FIG. 9 and FIG. 10 shares the comparison section and the inverted amplification section, and these configurations and operations enable high-speed image capturing by generating a digital signal for each of the pixel cells. Moreover, even in a state in which light that is so strong that photoelectric conversion is impossible in photoelectric converter 100 is emitted to photoelectric converter 100, photoelectric converter 100 generates a digital signal while being subjected to initialization. As a result, it is possible to capture an image even in a scene that is bright enough to exceed the conversion capacity of photoelectric converter 100. In addition, with the configuration and operation in which only the first initialization is performed by feeding back the amplified signal, it is possible to achieve excellent image capturing with low noise only in a dark scene where low noise is particularly required, while achieving low power consumption by reducing the number of structural components and spatially higher-resolution image capturing by reducing the pixel size.

Embodiment 6

In Embodiment 6, an example of the configuration in which a tapered gate signal is supplied to the gate of the transistor included in initializer 101.

Figure 11A:
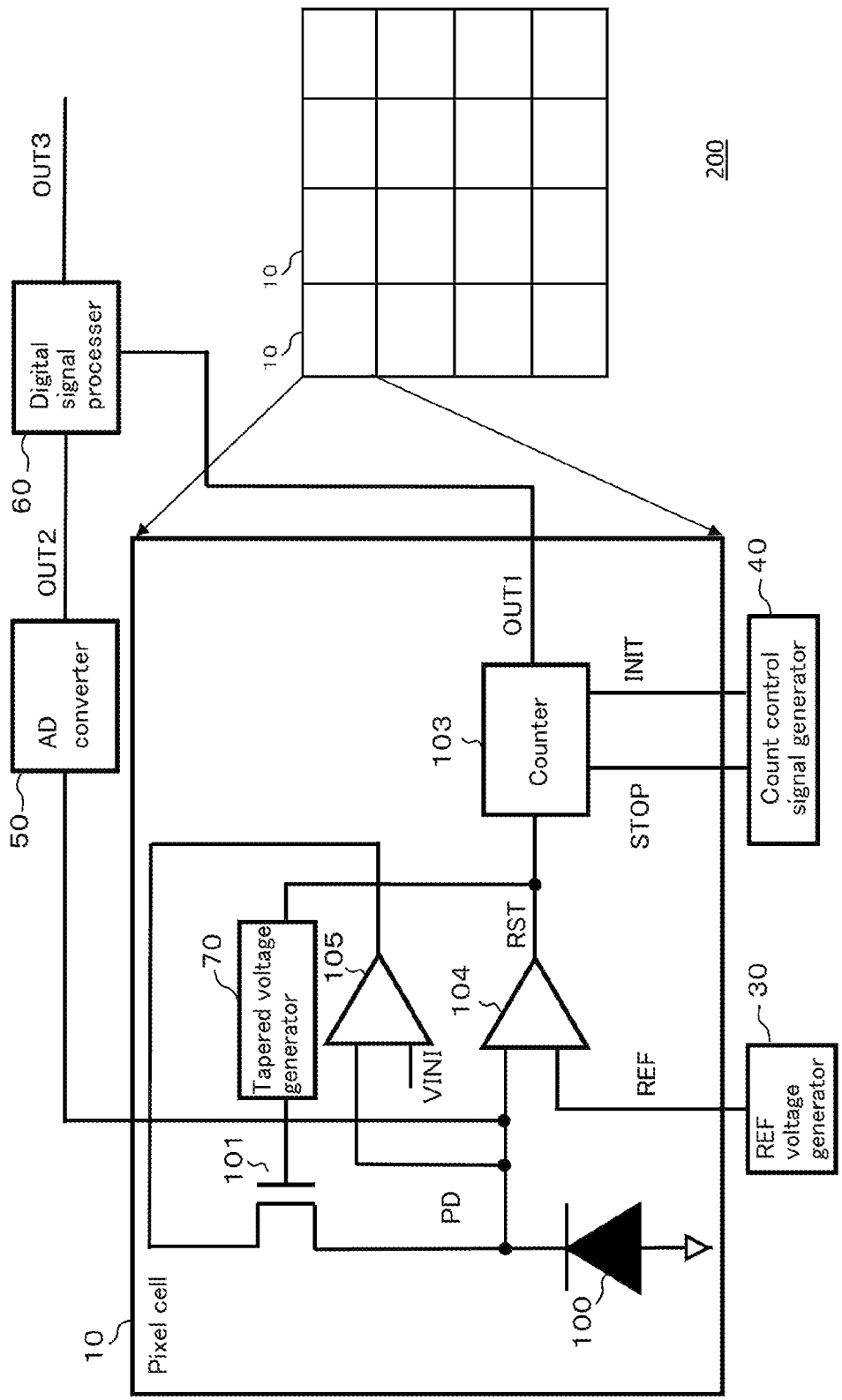
FIG. 11A is a diagram illustrating an example of the configuration of a solid-state imaging device according to Embodiment 6.
Figure 11B:
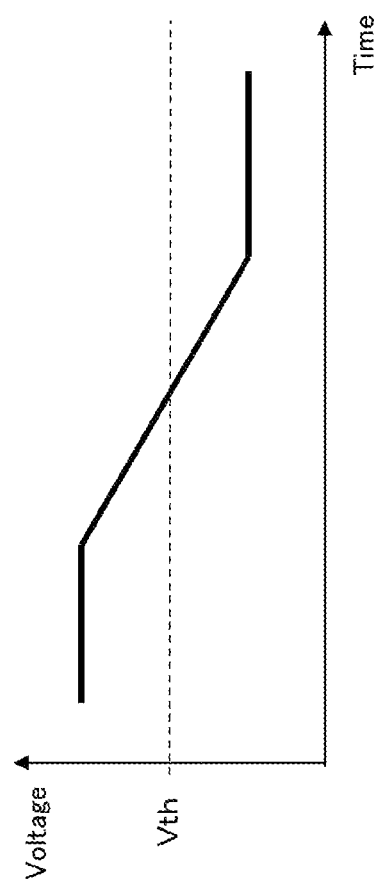

FIG. 11A is a diagram illustrating an example of the configuration of a solid-state imaging device according to Embodiment 6. In addition, FIG. 11B is a diagram illustrating the voltage waveforms generated by tapered voltage generator 70 illustrated in FIG. 11A.

FIG. 11A differs from FIG. 8 in that tapered voltage generator 70 is added. The following description focuses on the differences.

When a signal indicating that the potential of photoelectric converter 100 matches a predetermined reference signal is input from inverted amplification section 104, tapered voltage generator 70 generates a tapered voltage whose voltage varies over time, and supplies the tapered voltage to the gate of the transistor of initializer 101.

In this manner, by limiting the band at the time of initialization of photoelectric converter 100, solid-state imaging device 200 according to Embodiment 6 increases the effect of reducing the amount of noise superimposed on output signal PD of photoelectric converter 100 by taper resetting which controls the ON/OFF of the switch using a signal whose voltage changes at a constant rate over time. As a result, excellent image capturing with less noise is achieved even in a dark scene.

Embodiment 7

In Embodiment 7, an example in which solid-state imaging device 200 includes two stacked semiconductor substrates will be described.

Figure 12:
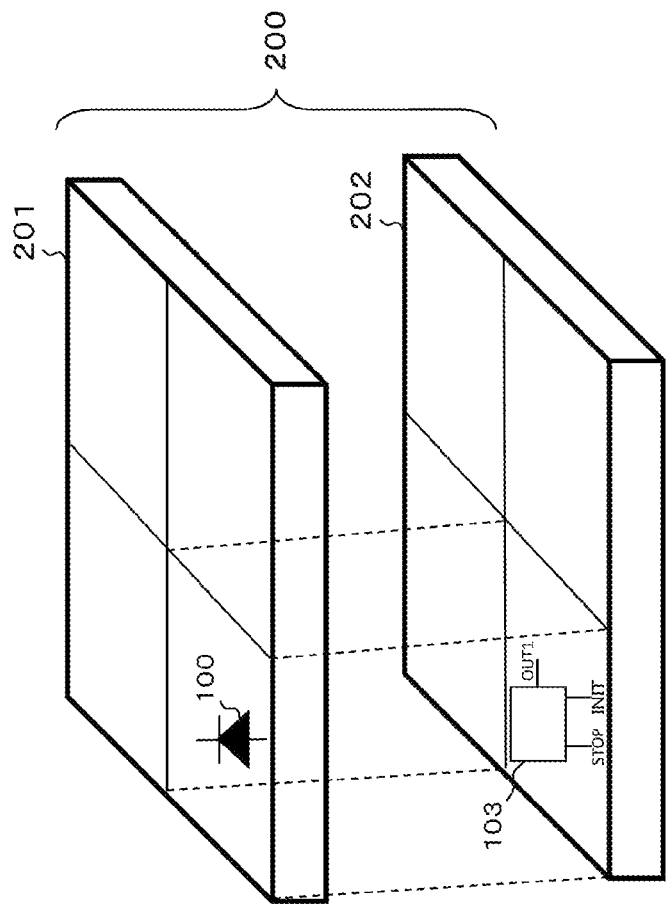
FIG. 12 is a diagram illustrating an example of the configuration of a solid-state imaging device according to Embodiment 7.

FIG. 12 is a diagram illustrating an example of the configuration of solid-state imaging device 200 according to the present embodiment. Solid-state imaging device 200 illustrated in the diagram includes first semiconductor substrate 201 including photoelectric converter 100 and second semiconductor substrate 202 including counter 103. First semiconductor substrate 201 and second semiconductor substrate 202 are stacked and electrically connected to each other.

As illustrated in FIG. 12, photoelectric converter 100 and counter 103 are disposed on different semiconductor substrates. It should be noted that photoelectric converter 100 and counter 103 can be any of those used in solid-state imaging device 200 described in FIG. 1A through FIG. 11B.

According to the above-described configuration, it is possible to reduce the area of cells per pixel by stacking photoelectric converter 100 and counter 103. As a result, it is possible to achieve spatially higher-resolution image capturing.

It should be noted that second semiconductor substrate 202 may include AD converter 50.

INDUSTRIAL APPLICABILITY

The solid-state imaging device according to the present disclosure is applicable in a camera and a distance-measuring sensor, for example.

The invention claimed is:

1. A solid-state imaging device comprising:
a plurality of pixel cells arranged in a matrix, wherein each of the plurality of pixel cells includes:
a photoelectric converter that generates charge by photoelectric conversion, and holds a potential according to an amount of the charge generated;
an initializer that initializes the potential of the photoelectric converter;
a comparison section that compares the potential of the photoelectric converter and a predetermined reference signal, and causes the initializer to perform initialization when the potential of the photoelectric converter and the predetermined reference signal match; and
a counter that counts a total number of times of initialization performed by the initializer, and outputs a signal corresponding to the total number of times as a first signal indicating an intensity of incident light.

2. The solid-state imaging device according to claim 1 further comprising:
an AD converter that converts the potential of the photoelectric converter from analog to digital after a last initialization, and outputs converted data as a second signal indicating an intensity of incident light.

3. The solid-state imaging device according to claim 2, wherein
the AD converter is disposed for each of the plurality of pixel cells.

4. The solid-state imaging device according to claim 2, wherein
the AD converter is disposed for each predetermined number of the plurality of pixel cells.

5. The solid-state imaging device according to claim 2, further comprising:
a signal processor that generates a third signal indicating an intensity of incident light, by combining the first signal and the second signal.

6. The solid-state imaging device according to claim wherein
each of the plurality of pixel cells further includes
a feedback circuit that feeds back the potential of the photoelectric converter to the photoelectric converter via the initializer when the initializer performs initialization.

7. The solid-state imaging device according to claim 6, wherein
the feedback circuit includes an amplification section which outputs, as an initial voltage, a difference between a voltage of the photoelectric converter and a predetermined voltage, to the initializer.

8. The solid-state imaging device according to claim 7, wherein
the initializer includes a transistor,
one of a source and a drain of the transistor is connected to the photoelectric converter,
the initial voltage is input to a remaining one of the source and the drain of the transistor,
a gate of the transistor is connected to an output line indicating a result of the comparison by the comparison section, and
the amplification section includes an amplifier which outputs, as the initial voltage, the difference between the voltage of the photoelectric converter and the predetermined voltage, to the remaining one of the source and the drain of the transistor.

9. The solid-state imaging device according to claim wherein
the initializer includes a transistor,
one of a source and a drain of the transistor is connected to the photoelectric converter, an initial voltage is input to a remaining one of the source and the drain of the transistor, and a gate of the transistor is connected to an output line indicating a result of the comparison by the comparison section.

10. The solid-state imaging device according to claim 1, wherein each of the plurality of pixel cells further includes an initialization controller that causes the initializer to perform initialization when an output line indicating a result of the comparison by the comparison section is inverted, and feeds back the potential of the photoelectric converter to the photoelectric converter via the initializer.

11. The solid-state imaging device according to claim wherein each of the plurality of pixel cells further includes:

an overflow drain section for discharging charge; and a transfer transistor that transfers charge exceeding a predetermined amount of charge for the photoelectric converter to the overflow drain section, and a potential of the overflow drain section is input to the comparison section as the potential of the photoelectric converter.

12. The solid-state imaging device according to claim 8, further comprising:

a tapered voltage generator that generates a tapered voltage whose voltage varies over time and supplies the tapered voltage to the gate of the transistor when a signal indicating that the potential of the photoelectric converter matches a predetermined reference signal is input from the comparison section.

13. The solid-state imaging device according to claim comprising:

a first semiconductor substrate including the photoelectric converter; and a second semiconductor substrate including the counter, wherein the first semiconductor substrate and the second semiconductor substrate are stacked.

14. The solid-state imaging device according to claim 2, comprising:

a first semiconductor substrate including the photoelectric converter; and a second semiconductor substrate including the AD converter, wherein the first semiconductor substrate and the second semiconductor substrate are stacked.

* * * * *